Dec. 1, 1942.　　　J. N. M. HOWELLS　　　2,303,742
STEREOSCOPIC DEVICE
Filed March 21, 1940
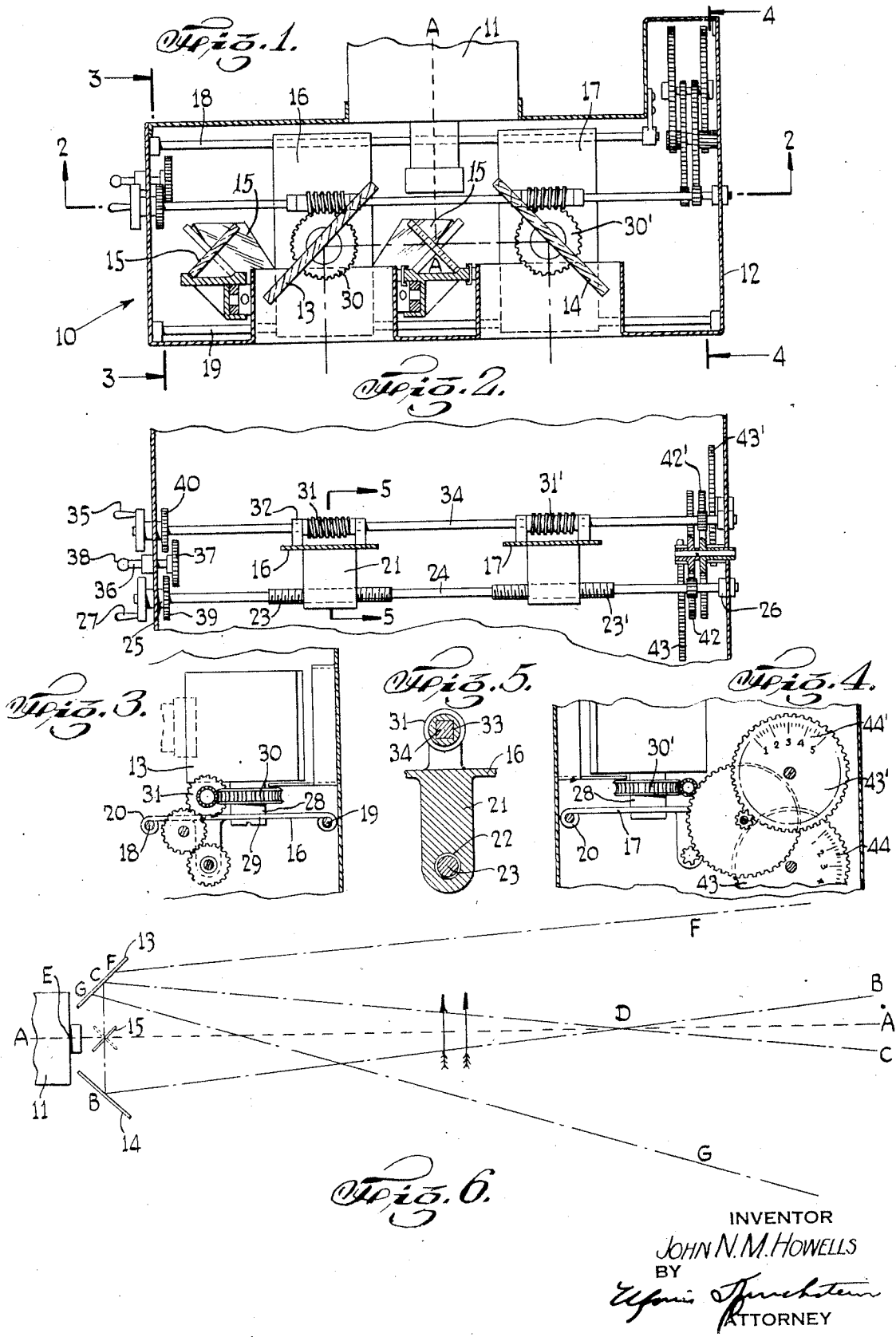
INVENTOR
John N. M. Howells
BY
ATTORNEY Patented Dec. 1, 1942

2,303,742

UNITED STATES PATENT OFFICE 2,303,742

STEREOSCOPIC DEVICE

John N. M. Howells, Kittery, Maine

Application March 21, 1940, Serial No. 325,140

6 Claims. (Cl. 88—16.6)

This invention relates to stereoscopic devices and methods of using the same. More particularly the invention relates to a method and means for adjusting the optical system of stereoscopic devices.

Ordinarily the optical elements of a stereoscopic device such as used for stereoscopic photography are maintained in a predetermined and fixed relationship regardless of the spacing of objects to be photographed relative to the camera. One of the objects of my invention is to provide a highly improved stereoscopic apparatus wherein a variation in the relative positioning of the stereoscopic elements is readily made to remedy unusual stereoscopic effects due to unusual positioning of the photographed subjects relative to the camera or to create unusual stereoscopic effects with an ordinary positioning of said subjects.

Another object of my invention is to adjust the optical elements of a stereoscopic device of the character described so as to enable stereoscopic pictures to be taken which, when projected, will closely resemble three dimensional reality.

Another object of my invention is to provide a method and means of the character described for use with a motion picture camera having a single optical axis and employing a single roll of film on which consecutive frames alternately contain right and left views.

A further object of my invention is to provide a novel device of the character described which shall occupy a relatively small space and be simple to adjust and operate.

Other objects of this invention will in part be obvious and in part hereinafter pointed out.

The invention accordingly consists in the features of construction, combination of elements, and arrangements of parts which will be exemplified in the construction hereinafter described, and of which the scope of application will be indicated in the following claims.

Certain features of my invention shown herein are fully shown, described, and claimed in my copending application for Stereoscopic device, Ser. No. 325,139 filed March 21, 1940.

In the accompanying drawing, in which is shown one of the various possible embodiments of this invention, Fig. 1 is a horizontal sectional view through a stereoscopic device embodying my invention.

Fig. 2 is a sectional view taken along the line 2—2 of Fig. 1.

Fig. 3 is a sectional view taken along the line 3—3 of Fig. 1.

Fig. 4 is a sectional view taken along the line 4—4 of Fig. 1.

Fig. 5 is an enlarged view taken along the line 5—5 of Fig. 2.

Fig. 6 is a schematic view of the elements and optical system of a stereoscopic device embodying my invention.

Referring now in detail to the drawing, I have illustrated a stereoscopic device 10 embodying my invention attached to a motion picture camera 11. The stereoscopic device 10, which may be of the type more fully illustrated and described in my said copending application Serial No. 325,139, may comprise a housing 12 having a pair of lateral viewing reflectors 13 and 14 symmetrically disposed with respect to the optical axis A—A of the camera 11 and a belt of moving reflectors 15 adapted alternately to reflect images from the right and left reflectors 13 and 14 into said camera. The camera 11 may be of the type which takes the usual two dimensional pictures but is adapted to run at a speed higher than that ordinarily required, say at a rate of thirty-two frames per second, and the operation of the camera 11 is synchronized with the rate of travel of the moving belt of reflector 15 as is more fully illustrated and described in my said copending application.

Means is provided for varying the spacing between the lateral viewing reflectors 13 and 14. Such means may comprise two platforms 16 and 17 slidably mounted upon shafts 18 and 19 which are fixed in the housing 12. The front and rear ends of said platform may be provided with integrally formed bearings 20 to captively hold the platforms slidably on the shafts. Brackets 21 having aligned oppositely threaded bores 22 may depend from the lower faces of each of the platforms 16 and 17. Engaging said oppositely threaded bore 22 are a pair of right and left hand external threads 23 and 23' suitably formed on a shaft 24 which may be journalled as at 25 and 26 in the walls of the housing 12. One end of the shaft 24 may extend through the housing and be conveniently provided with a handle 27. The reflectors 13 and 14 are fixedly mounted on shanks 28 carried by the platforms 16 and 17. It is thus apparent that as the shaft 24 is rotated in one direction the two platforms 16 and 17 and reflectors 13 and 14 will simultaneously move towards each other and when the direction of rotation of the shaft 24 is reversed the platforms and reflectors will move apart.

Means is also provided for varying the angular position of the lateral reflectors 13 and 14 with respect to the optical axis A—A of the camera 11. Said means may comprise journalling the shanks 28 on the platforms 16 and 17 as at 29 so that they may rotate with respect to said platforms. To facilitate this rotation, I may provide worm wheels 30 and 30' on the shanks 28 having oppositely inclined teeth and meshing with right and left handed worms 31 and 31'. Posts 32 on the platforms 16 and 17 may rotatably support said worms 31 and 31' in permanent engagement with the worm wheels 30 and 30'. Said worms may be provided with aligned square central bores 33 for slidable engagement on a square shaft 34 which extends through the casing 12 near the handle 27 on the spacing shaft 24 and is also provided with a handle 35. Obviously, rotation of the shaft 34 in either direction will cause both viewing reflectors 13 and 14 to equally increase or decrease the angle they make with the optical axis A—A of the camera 11. Adjustment of the spacing between the platforms will not affect the angular positioning of the lateral reflectors 13 and 14 as during the movement of the platforms 16 and 17 accompanying such adjustment, the worms 31 and 31' will remain in mesh with the worm wheels 30 and 30' and slide along the shaft 34 without rotating if the shaft 34 remains stationary.

In case it may be desired simultaneously to adjust both the spacing and angular relationship of the reflectors 13 and 14, a stud 36 may be provided having an idler 37 rotatably mounted at one end thereof and a handle 38 at the other end. When the handle is pulled away from the casing 12, the idler 37 will mesh with gears 39 and 40 fixed to the spacing adjustment shaft 24 and angular adjustment shaft 34 respectively, so that rotation of either handle 27 or 35 will cause simultaneous rotation of both shafts 24 and 34.

If desired, means may also be provided for visually indicating the spacing and orientation of the reflectors 13 and 14. Such means may comprise gear trains 42 and 42' driven from each adjusting shaft 24 and 34 and terminating in gears 43 and 43' having markings 44 and 44' on their faces which are visible from without the housing through suitably disposed apertures in the walls thereof.

I have found that by manipulating the spacing and the angular relationship of the lateral viewing reflectors 13 and 14, it is possible to present the photographed object to the viewer in a variety of aspects. The dimensions, perpendicular to the line of view of the camera 11, of an object may be made to appear large or small; the depth of the object along the line of view may be exaggerated, foreshortened or presented in its normal degree; and the object may be made to appear close or far away.

The use of stereoscopic apparatus embodying my invention in photographing an object such as the two arrows shown in Fig. 6 will now be described. The reflectors 13 and 14 may be adjusted with respect to each other by varying either their spatial or angular relationship so that the optical axis B—B and C—C of the stereoscopic device will converge at a point D spaced a distance D—E from the camera along the optical axis A—A of the camera. The lines F—F and G—G outline the field of view of one of the viewing reflectors 13.

The distance D—E or "convergence distance" controls the apparent position of a reproduced image relative to the observer in the following sense: Objects photographed at the convergence distance will always appear to the observer to be at the distance of the screen, objects photographed within the convergence distance, like the arrows shown in Fig. 6, will appear to be closer than the screen while objects photographed beyond the convergence distance will appear to be beyond the screen.

Within these limitations, the apparent distance of the projected image relative to an observer can also be varied by varying the spacing of the lateral reflectors, which will also vary the apparent depth and spacing of the objects along the line of view. In general, a greater separation of the reflectors with a given convergence distance will cause objects within the said convergence distance to seem closer and objects beyond said convergence distance to seem to be further away, and of an exaggerated depth. A lesser separation has opposite effects.

In general, also, the dimensions of objects perpendicular to the line of view will appear to become larger as the objects are made to appear further away from the observer.

This novel method of stereoscopic photography may be put to many uses, as, for example, in taking close-up views of an actor. Using stereoscopic apparatus incapable of the adjustments described, as has heretofore been done, a close-up of an actor's face appears as close to the observer as it is to the camera, a matter of only a few feet, which in scenes of intense emotion creates a very disturbing effect. With my novel apparatus, however, the convergence distance could be shortened so that the actor's features would seem to be at a reasonable distance from the observer, while the spacing of the lateral mirrors could be simultaneously reduced so that the apparent depth or radial dimension of the scene would not be exaggerated.

Small objects such as insects and other scientific subjects, or small works of art, could be photographed close to the camera with a suitable reduction of the convergence distance and lateral spacing of the optical axes so as to make them appear very large and situated at the most comfortable distance from the observer.

Large and distant scenes could be made, by an increase in the convergence distance and spacing of the optical axes, to appear close and intimate.

Also, the apparent depth of objects as well as their distance from an observer could be exaggerated or reduced to any degree, or could be made to change during the progress of a scene, objects seeming to recede or approach, to grow or decrease in depth by simultaneous manipulation of the adjustments for the spacing and the angular orientation of the lateral mirrors during the photographing of a scene.

The actual setting of the two adjustments necessary to accomplish any desired effect in the matter of the apparent distance of an object, its apparent size and the degree of exaggeration or reduction of depth in the scene, can be calculated before-hand by means of simple formulae derived from the geometrical set-up. The illustration given above should sufficiently exemplify the unusual and valuable effects that can be obtained, and the uses and advantages of my invention.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a stereoscopic device of the character described adapted to be used with a camera having a single optical axis, the combination of a pair of viewing reflectors and means to support said reflectors for simultaneous lateral displacement relative to said optical axis and for simultaneous angular displacement relative to said optical axis while maintaining said reflectors symmetrically disposed with respect to said axis, said means comprising a pair of platforms, means to support said platforms for translatable movement perpendicular to said optical axis, a member rotatably mounted on each of said platforms, each of said members having one of said reflectors rigidly supported thereon, a pair of rotatable shafts disposed parallel to the direction of movement of said platforms, one of said shafts having a pair of oppositely spiraled screw threaded portions, each of said screw threads cooperating with a tapped mating aperture in one of said platforms, said second shaft having a pair of oppositely spiraled worm gears slidably and non-rotatably mounted thereon, each of said worm gears being permanently in mesh with a worm wheel rotatable with one of said members.

2. In a stereoscopic device of the character described adapted to be used with a camera having a single optical axis, the combination of a pair of viewing reflectors and means to support said reflectors for simultaneous lateral displacement relative to said optical axis and for simultaneous angular displacement relative to said optical axis while maintaining said reflectors symmetrically disposed with respect to said axis, said means comprising a pair of platforms, means to support said platforms for translatable movement perpendicular to said optical axis, said last named means comprising a pair of rods slidably received in bearings attached to said platforms, a member rotatably mounted on each of said platforms, each of said members having one of said reflectors rigidly supported thereon, a pair of rotatable shafts disposed parallel to the direction of movement of said platforms, one of said shafts having a pair of oppositely spiraled screw threaded portions, each of said screw threads cooperating with a tapped mating aperture in one of said platforms, said second shaft having a pair of oppositely spiraled worm gears slidably and non-rotatably mounted thereon, each of said worm gears being permanently in mesh with a worm wheel rotatable with one of said members.

3. In a stereoscopic device of the character described adapted to be used with a camera having a single optical axis, the combination of a pair of viewing reflectors and means to support said reflectors for simultaneous lateral displacement relative to said optical axis and for simultaneous angular displacement relative to said optical axis while maintaining said reflectors symmetrically disposed with respect to said axis, said means comprising a pair of platforms, means to support said platforms for translatable movement perpendicular to said optical axis, a member rotatably mounted on each of said platforms, each of said members having one of said reflectors rigidly supported thereon, a pair of rotatable shafts disposed parallel to the direction of movement of said platforms, one of said shafts having a pair of oppositely spiraled screw threaded portions, each of said screw threads cooperating with a tapped mating aperture in one of said platforms, said second shaft having a pair of oppositely spiraled worm gears slidably and non-rotatably mounted thereon, each of said worm gears being permanently in mesh with a worm wheel rotatable with one of said members, and means for visually indicating the lateral and angular position of said reflectors relative to said axis.

4. In a stereoscopic device of the character described adapted to be used with a camera having a single optical axis, the combination of a pair of viewing reflectors and means to support said reflectors for simultaneous lateral displacement relative to said optical axis and for simultaneous angular displacement relative to said optical axis while maintaining said reflectors symmetrically disposed with respect to said axis, said means comprising a pair of platforms, means to support said platforms for translatable movement perpendicular to said optical axis, a member rotatably mounted on each of said platforms, each of said members having one of said reflectors rigidly supported thereon, a pair of rotatable shafts disposed parallel to the direction of movement of said platforms, one of said shafts having a pair of oppositely spiraled screw threaded portions, each of said screw threads cooperating with a tapped mating aperture in one of said platforms, said second shaft having a pair of oppositely spiraled worm gears slidably and non-rotatably in mesh with a worm wheel rotatable with one of said members, said shafts being disposed in vertical alignment.

5. In a stereoscopic device of the character described adapted to be used with a camera having a single optical axis, the combination of a pair of viewing reflectors symmetrically laterally and symmetrically angularly disposed with respect to said optical axis, means to simultaneously and positively vary the angular disposition of said reflectors while maintaining their angular symmetry with respect to said axis, and independent means to simultaneously and positively vary the lateral spacing of said reflectors with respect to said axis while maintaining their lateral symmetry with respect to said axis, said means for varying the angular position of said reflectors and said means for varying the lateral position of said reflectors being mutually unaffected by each others operations.

6. In a stereoscopic device of the character described adapted to be used with a camera having a single optical axis, the combination of a pair of viewing reflectors symmetrically laterally and symmetrically angularly disposed with respect to said optical axis, means to simultaneously and positively vary the angular disposition of said reflectors while maintaining their angular symmetry with respect to said axis, independent means to simultaneously and positively vary the lateral spacing of said reflectors with respect to said axis while maintaining their lateral symmetry with respect to said axis, said means for varying the angular position of said reflectors and said means for varying the lateral position of said reflectors being mutually unaffected by each others operation, and means to optionally interconnect for common actuation said means for varying the angular position of said reflectors and said means for varying the lateral position of said reflectors.

JOHN N. M. HOWELLS.